United States Patent
Li et al.

(10) Patent No.: US 8,830,899 B2
(45) Date of Patent: Sep. 9, 2014

(54) DYNAMIC MOBILE NETWORK TRAFFIC CONTROL

(75) Inventors: Siu Lung Li, Chaiwan (HK); Stephen Lacey, Nummela (FI); Mikko Kauko Johannes Jarva, Petaling Jaya (MY)

(73) Assignee: Comptel Corporation, Helsinki (FI)

( * ) Notice: Subject to any disclaimer, the term of this patent is extended or adjusted under 35 U.S.C. 154(b) by 295 days.

(21) Appl. No.: 13/140,117

(22) PCT Filed: Dec. 16, 2009

(86) PCT No.: PCT/FI2009/051004
§ 371 (c)(1),
(2), (4) Date: Sep. 23, 2011

(87) PCT Pub. No.: WO2010/070201
PCT Pub. Date: Jun. 24, 2010

(65) Prior Publication Data
US 2012/0020218 A1  Jan. 26, 2012

Related U.S. Application Data (60) Provisional application No. 61/138,903, filed on Dec. 18, 2008.

(30) Foreign Application Priority Data

Dec. 17, 2008  (EP) ..................... 08171945

(51) Int. Cl.
*H04J 1/00*  (2006.01)
*H04J 3/08*  (2006.01)
*H04W 4/00*  (2009.01)

(52) U.S. Cl.
USPC ............ 370/315; 370/328; 370/474; 455/453

(58) Field of Classification Search
USPC ........... 370/232–235, 328–335; 455/422–512
See application file for complete search history.

(56) References Cited

U.S. PATENT DOCUMENTS

| | | | | |
|---|---|---|---|---|
| 6,069,871 A | * | 5/2000 | Sharma et al. | 370/209 |
| 6,128,500 A | * | 10/2000 | Raghavan et al. | 455/453 |
| 6,697,378 B1 | * | 2/2004 | Patel | 370/468 |
| 6,738,637 B1 | * | 5/2004 | Marinho et al. | 455/512 |
| 7,305,241 B2 | * | 12/2007 | Hirvonen et al. | 455/453 |

(Continued)

FOREIGN PATENT DOCUMENTS

| | | |
|---|---|---|
| EP | 1011228 A3 | 6/2000 |
| EP | 1011228 A2 | 7/2003 |
| WO | WO 2004028181 | 4/2004 |
| WO | WO2006-075951 | 7/2006 |

*Primary Examiner* — Man Phan
(74) *Attorney, Agent, or Firm* — Faegre Baker Daniels LLP (57) ABSTRACT

Document discloses methods, systems and computer program products for dynamic mobile network traffic control. In an embodiment of the method comprises controlling data traffic (100) between a plurality of mobile terminals (102A, 102B, 104A, 104B) and a mobile network comprising a plurality of cell sites (110A, 110B, 110C). The method comprises monitoring cell-site-specific volumes of data traffic (100) in order to detect high-load cell sites (110A, 110B) among the plurality of cell sites. For each of the detected high-load cell sites, a mobile-terminal-specific analysis of data traffic (100) is performed in order to select at least one of the mobile terminals (102A, 102B, 104A, 104B) for traffic limitation. Thereafter, the data traffic (100) between the mobile network and the selected at least one mobile terminal (104A, 104B) is temporarily limited.

19 Claims, 4 Drawing Sheets

(56) References Cited

U.S. PATENT DOCUMENTS

| | | | |
|---|---|---|---|
| 7,466,652 B2 * | 12/2008 | Lau et al. | 370/230.1 |
| 7,724,656 B2 * | 5/2010 | Sågfors et al. | 370/229 |
| 7,860,512 B2 * | 12/2010 | Hirvonen et al. | 455/453 |
| 8,385,200 B2 * | 2/2013 | Rainer et al. | 370/232 |
| 2002/0077111 A1 | 6/2002 | Spaling et al. | |
| 2004/0033806 A1 | 2/2004 | Daniel et al. | |
| 2005/0041584 A1 | 2/2005 | Lau et al. | |
| 2007/0058561 A1 | 3/2007 | Virgile | |

* cited by examiner

DYNAMIC MOBILE NETWORK TRAFFIC CONTROL

CROSS-REFERENCE TO RELATED APPLICATION

This application is a National Stage filing of International Application Serial No. PCT/FI2009/051004, filed Dec. 16, 2009, which claims the benefit of U.S. Provisional Application Ser. No. 61/138,903 filed Dec. 18, 2008, and European Patent Application No. 08171945.2, filed Dec. 17, 2008, the disclosures of which are expressly incorporated herein by reference.

TECHNICAL FIELD

The present invention relates to methods, systems and computer program products for controlling data traffic in a mobile network.

The present invention relates particularly to controlling data traffic between a plurality of mobile terminals and a mobile network comprising a plurality of cell sites.

In particular, the present invention relates to dynamic or on-line control of data traffic. In this context, the terms dynamic control and on-line control refer to the possibility of performing at least some control functions during the controlled traffic. One example of such a dynamic control is altering parameters relating to a data session during the data session itself. Opposite to such dynamic or on-line control would be a control method and system that is not capable of reacting during a data session but any possible control functions would be performed only after or before such data traffic.

One specific application for such control methods and systems is to control quality of service (QoS) or bandwidth offered for mobile terminals using broadband services over mobile connection. Such broadband services include TV, web browsing, streaming and downloading videos and other files, and e-mail.

The dynamic nature of the control is beneficial when optimizing the use of resources in the mobile network in order to fulfil as many of the service requests from the users as possible. Thus, the aim in optimization is that, at each moment, all of the active users could obtain services with an appropriate quality of service.

BACKGROUND ART

Patent application publication US 2007/0058561 A1 discloses a method of renegotiating QoS levels of a communication link in one or more networks. The communication link has an initial QoS level prior to renegotiation and the method includes examining information flowing on the communication link between a first network endpoint and a second network endpoint. The method also includes determining, based on the information, a type of application being used by the first and second network endpoints for the communication link. The method further includes determining a QoS level that is suitable for the application, and negotiating with at least one of the one or more networks to procure resources associated with the network that will provide the suitable QoS level.

DISCLOSURE OF INVENTION

It is an object of the present invention to create a new method, system and computer program product for controlling data traffic in a mobile network.

According to an aspect of the invention, there is provided a method of controlling data traffic between a plurality of mobile terminals and a mobile network comprising a plurality of cell sites. The method comprises monitoring cell-site-specific volumes of data traffic in order to detect high-load cell sites among the plurality of cell sites. The method further comprises performing, for each of the detected high-load cell sites, a mobile-terminal-specific analysis of data traffic in order to select at least one of the mobile terminals for traffic limitation, and temporarily limiting the data traffic between the mobile network and the selected at least one mobile terminal.

According to another aspect of the invention, there is provided a mediation and activation system for a mobile network comprising a plurality of cell sites. The system comprises means for monitoring cell-site-specific volumes of data traffic in order to detect high-load cell sites among the plurality of cell sites. The system further comprises an analyzer for performing a mobile-terminal-specific analysis of the data traffic in each of the detected high-load cell sites and selecting at least one of the mobile terminals for traffic limitation. Furthermore, the system comprises means for temporarily limiting the data traffic between the mobile network and the selected at least one mobile terminal.

According to a further aspect of the invention, there is provided a computer program product comprising program code capable of instructing a computer system to perform the method according the invention.

The invention provides a new method, system and computer program product for controlling data traffic in a mobile network, with the associated benefits over the prior art at least in some applications.

For example, the invention provides data traffic analysis on two different levels, on a cell-site-level and a mobile-terminal-level.

The analysis on the cell-site-level makes it possible to detect the high-load cell sites among the plurality of cell sites and apply the traffic limitation in respect of the data traffic through the high-load cell sites alone. Thus, the traffic limitation measures can be directed to the problem areas in the network and the other cell sites can be left unaffected. This provides the maximum quality of service for the users connected to the non-high-load cell sites. The method disclosed in the above-mentioned publication US 2007/0058561 A1 does not allow such a cell-site-specific analysis.

The analysis on the mobile-terminal-level, for its part, makes it possible to select those mobile terminals for traffic limitation that use non-critical services, which are to a lesser extent affected by such limitation. The mobile-terminal-specific analysis of data traffic also enables use of other selection criteria in order to restrict excessive service usage and to provide fair access for all of the users within a cell site. When combined with the prior cell-site-specific analysis, the mobile-terminal-specific analysis offers very effective way to provide an appropriate quality of service for the users within high-load cell sites and a maximum quality of service for the users connected through the other cell sites.

The inventive concept allows also several useful and advantageous embodiments, which provide further advantages.

In an embodiment, the data traffic monitoring is made by means of a mediator system connected to the mobile network. In this case, the mediator system can be effectively utilized in the data traffic monitoring, cell-site-specific analysis and mobile-terminal-specific analysis.

In another embodiment, the mediator system is a real-time mediator system and allows very fast reaction times in the control of data traffic.

In a further embodiment, the data traffic limitation can be effectively implemented by means of an activation system in communication with the mediator system.

In embodiments using mediator systems for monitoring data traffic, there are numerous parameters available that can be taken into account in optimizing the data traffic.

Furthermore, the mediator systems typically have interfaces to operations and business support systems of the mobile operator, and therefore can readily utilize information on the service contracts made with the particular users, if desired.

When a mediator system is used in data traffic control, there is no need to provide the network with additional systems or traffic probes. Furthermore, the decisions are based on very reliable information as the mediator systems are designed to handle usage information for billing purposes.

Therefore, there are embodiments that allow mobile-terminal-specific traffic limitation based on the communication needs of other users and the resources of the mobile network. The limitation can be applied temporarily during peak load times. The limitation can also be directed to problem areas in the network and leave the other areas unaffected. Also the types of services used by the users can be taken into account in decisions. Therefore, in such embodiments, the traffic limitation has a minimum impact on the service experience of the users under traffic limitation while guaranteeing mobile network connection to as many mobile terminals as possible. This means also that the mobile network operators can safely sell subscriptions with unlimited usage price plans and/or the maximum supported bandwidth as there is no risk of long time service congestion in the network. It should be noticed that unlimited usage price plans and/or the maximum supported bandwidth price plans can be set such that the actually offered bandwidth is not the maximum bandwidth supported by the network. Thus, the maximum actually offered bandwidth can also be set to a level below the maximum bandwidth supported by the network.

As is apparent from the above discussion, embodiments of the invention can be utilized in various ways in order to perform dynamic mobile network data traffic control. In particular, the embodiments can be utilized regardless of the price plans. Thus, the embodiments can be used also in respect of all the mobile terminals within the network. The embodiments can also be used directed to a group of terminals selected according to desired other criteria. The price plan of the users can be used as one parameter in making the decisions relating to traffic limitation, if desired. Other possible parameters include type of the service currently used, for instance. These parameters can be used to direct the traffic limitation decision, which is however based on the technical facts of volumes of data traffic.

BRIEF DESCRIPTION OF DRAWINGS

For a more complete understanding of the present invention and the advantages thereof, the invention is now described with the aid of the examples and with reference to the following drawings, in which.

DEFINITIONS

Cell site (110A, 110B, 110C) is a portion of the coverage area of the mobile network that is served by one base station antenna.

User (102A, 102B, 104A, 104B) is a subscriber using the network with its terminal via a radio connection to a cell site.

Unlimited plan is for example a subscription form of user. Unlimited plan allows users to utilize maximum capacity of bandwidth and QoS. Users having unlimited plan have accepted that operator can temporarily change (lower and resume) the bandwidth and QoS of their connections without any notice to keep the cell sites functioning to all users in the area of cell site, and to avoid traffic congestion in the cell site. The subscription plan can also be limited to a certain amount of capacity from the maximum capacity available and QoS.

BEST MODE FOR CARRYING OUT THE INVENTION

The embodiments described in the following utilize a QoS server 140, an activation system 180 and a mediation system 170 that provides real-time collection and processing.

Real-time collection and processing is an efficient way to gather and analyse the traffic amounts in cell sites and to find out heavy users within particular cell sites. Furthermore the real-time collection and processing contains very efficient aggregation means to combine and compare the gathered information on traffic amounts, cell sites and users. At the end the real-time collection and processing decides to what users the lowering and resuming changes must be executed.

Activation system 180 receives and executes the lowering and resuming requests. The requests are transmitted to QoS server 140, which further controls or monitors the actual data traffic.

QoS server 140 itself reduces the heavy users' bandwidth and QoS by tackling data traffic or by instructing some other network element such as GGSN to reduce the bandwidth and QoS of the heavy users.

The following description describes a preferred embodiment of the invention wherein the mobile cell site traffic management is a key mechanism for ensuring the operator has sufficient capacity. With radio traffic being a key resource within the mobile environment, optimisation at a cell site layer will have immediate benefits to the operator, especially in an environment where the operator offers an unlimited bandwidth package or a subscription of limited bandwidth although having enough bandwidth to any use that subscribers have at the time. In this document the embodiments are described mainly with examples of unlimited usage plan. It should be noted that instead of unlimited plan, the plan can be also limited to some amount of bandwidth of the maximum bandwidth available and QoS. The methods can also be used regardless of the price plans and any particular price plan is not a prerequisite for the use of the embodiments.

In this situation it is vital that the operator is able to ensure fair usage, especially in a world where P2P traffic has a major effect on the bandwidth limitation.

The embodiment of the invention continuously monitors the real-time traffic and uses a negative feedback mechanism to change the heavy users' QoS to a lower one.

Throughout this document we shall use an example of HSDPA within a 3G network to demonstrate the principles of the traffic management solution according to the invention. Such an embodiment is also described in FIG. 1.

Figure 1:
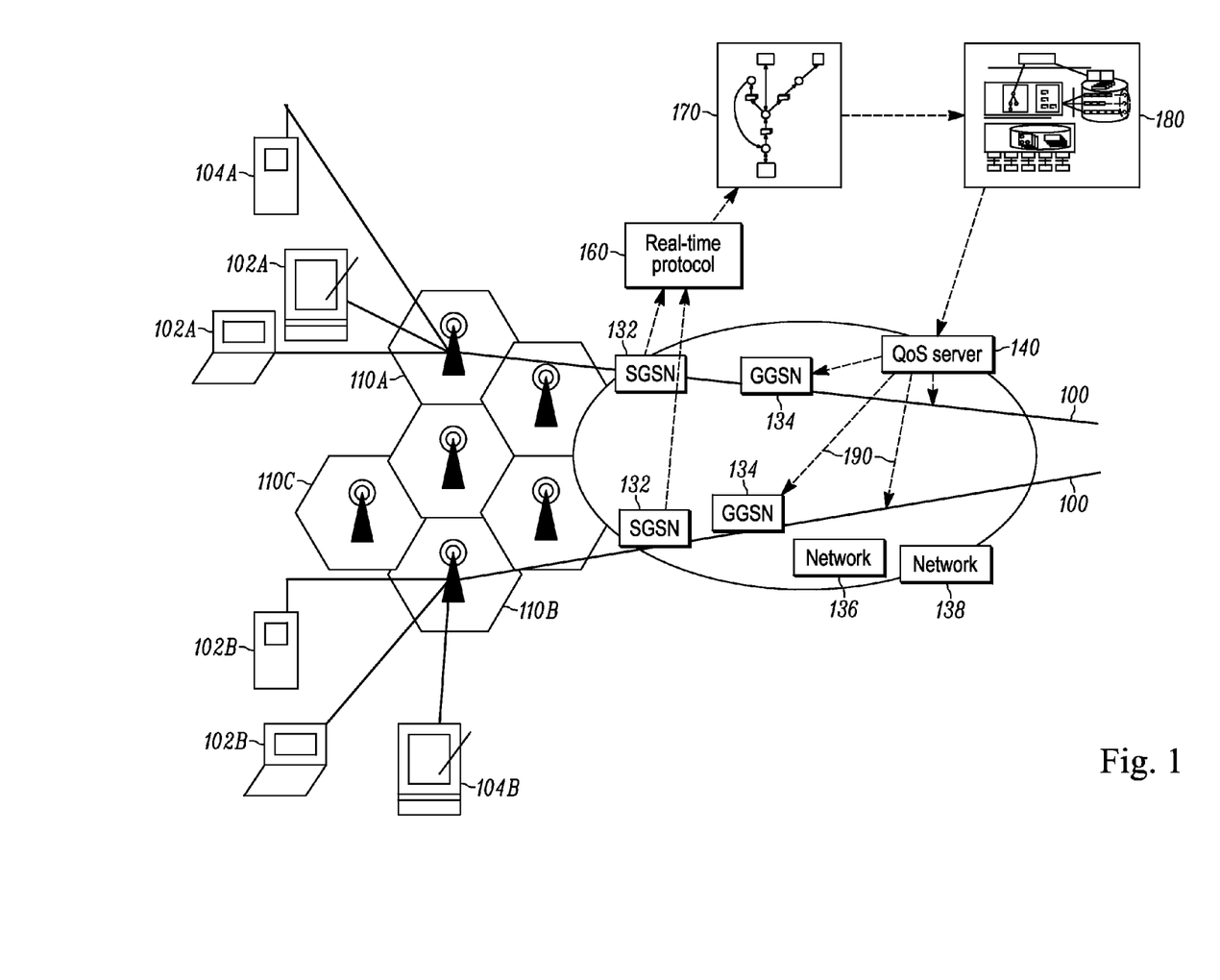
FIG. 1 presents as a block diagram an example of environment in which an embodiment of the invention can be used.

In FIG. 1, the mobile users 102A, 102B, 104A and 104B are creating mobile data sessions 100 within the network. On creation of a data session, a Quality of Service profile will be assigned to the session. This is usually defined somewhere within the network, such as in HLR/HSS in the 2G/3G/3.5G networks (136, 138). This QoS policy can be enforced by a policy control function that can be provided by QoS Server 140 or by other elements such as the GGSN 134.

Policy control can be initiated by a handset requesting higher quality of service in order to ensure the service quality, but the handset has no knowledge of the current cell capacity.

This invention looks from the network point of view. The embodiments look for cell sites 110A, 110B, 110C that are heavily loaded over a defined period of time. According to an embodiment of the invention, real time traffic information is utilized to identify end users (with unlimited usage plan) within the cell sites that are overloaded 110A, 110B. The embodiments utilise information from elements such as the SGSN 132 to get the required information on the users who are consuming the cell site capacity. This cell site capacity can be expressed, for example, as the amount of bytes downloaded during the active sessions 100 at the particular cell site, e.g. 110A. It is beneficial to process this information in a real time manner in order to ensure full utilisation of the cell site capacity. Overloaded cell sites are recognized by measuring total data traffic per cell site. When a predetermined high threshold limit is over-run, the system triggers a QoS lowering procedure. The high threshold can be any percentage between 0 and 100 and it is typically set between 70 to 90 percent of the total capacity of data traffic in any given cell site. The high threshold limit can be determined by operator and each of the cell sites can have its own individual threshold limit. These threshold limits can be stored in the system as a table, for instance.

According to a preferred embodiment of the invention for those unlimited users 104A, 104B who are using a considerable share of the capacity, a request is automatically triggered to instruct a Quality of Service change within the policy control function.

Lowering of the Quality of Service for those heavy users should free up more capacity within that particular cell site 110A, 110B. However, just downgrading the QoS of the sessions does not ensure efficient usage of the network. Therefore, once the cell site capacity usage has lowered to an acceptable level (low threshold), a resume of the original QoS level is issued for those heavy usage users 104A, 104B.

A method according to an embodiment has following steps:
Information on the "unlimited data plan" subscriptions 102A, 102B, 104A, 104B are periodically updated into a system collecting and processing traffic data, for instance a mediation system. This information can be stored in a corresponding table, which can be used to distinguish the users under "unlimited data plan" from the other users.
User usage messages are collected from network element e.g. SGSN 132 via a real-time protocol 160 e.g. GTP' to the mediation system 170.
Usage messages are aggregated in the mediation system 170 in a per-minute basis in two storages:
1. Total usage per cell site. This process enables the operator to examine which cell sites have the high threshold limit exceeded or the low threshold limit gone under.
2. Total usage per cell site per user. This process enables the operator to examine who are the heavy users in a particular cell site.

Aggregated usages are flushed out after a set time, for example one to twenty minutes, and cell site congestion status are checked against the traffic thresholds table for all cell sites 110A, 110B, 110C. For cell site(s) 110A, 110B that have reached the threshold, i.e. high threshold, a check for heavy users is performed. Furthermore, the heavy users 104A, 104B for that cell site are checked against the "unlimited plan" table.

The list of heavy users 104A, 104B with "unlimited plan" of the congested cell sites 110A, 110B are sent to the activation system 180 for QoS change.

The activation system 180 changes the QoS of the heavy users 104A, 104B on list to a lower level and submits an automatic "resume" request to be started after a set time, for example one to twenty minutes. If the QoS of the heavy user has been changed and there is an outstanding auto-resume request in the system 180, the auto-resume order will be delayed by a set time, for example one to twenty minutes.

When the system recognizes that there is again enough free capacity in a cell site, i.e. the capacity usage has gone under the low threshold level; the system resumes the QoS of the heavy users 104A, 104B to a normal level.

In both situations the resume or lower request ends at the QoS Server 180. Depending on the type of QoS server 180 they will have a mechanism to restrict 190 the data session flow 100 of the heavy users 104A, 104B. Other alternative is to instruct the GGSN 134 to restrict 190 the flow for example by controlling the session of the heavy users 104A, 104B. In both situations the users 104A, 104B are recognized from the data traffic 100 by identifying the sessions and requests made by users.

In an embodiment of the invention the volumes of data traffic 100, e.g. total usage per cell site and total usage per cell site per user, are determined periodically over consecutive periods of time, the period of time being less than 30 minutes, such as between 1 and 20 minutes, for example between 5 and 15 minutes. Furthermore the activation changes in QoS, i.e. lowering and resuming the user, follow a same kind of timing concept line. The intervals are not necessarily the same but somehow similar to get the process working adequately enough such that the control is efficient but does not change the bandwidth and QoS too often.

Figure 4:
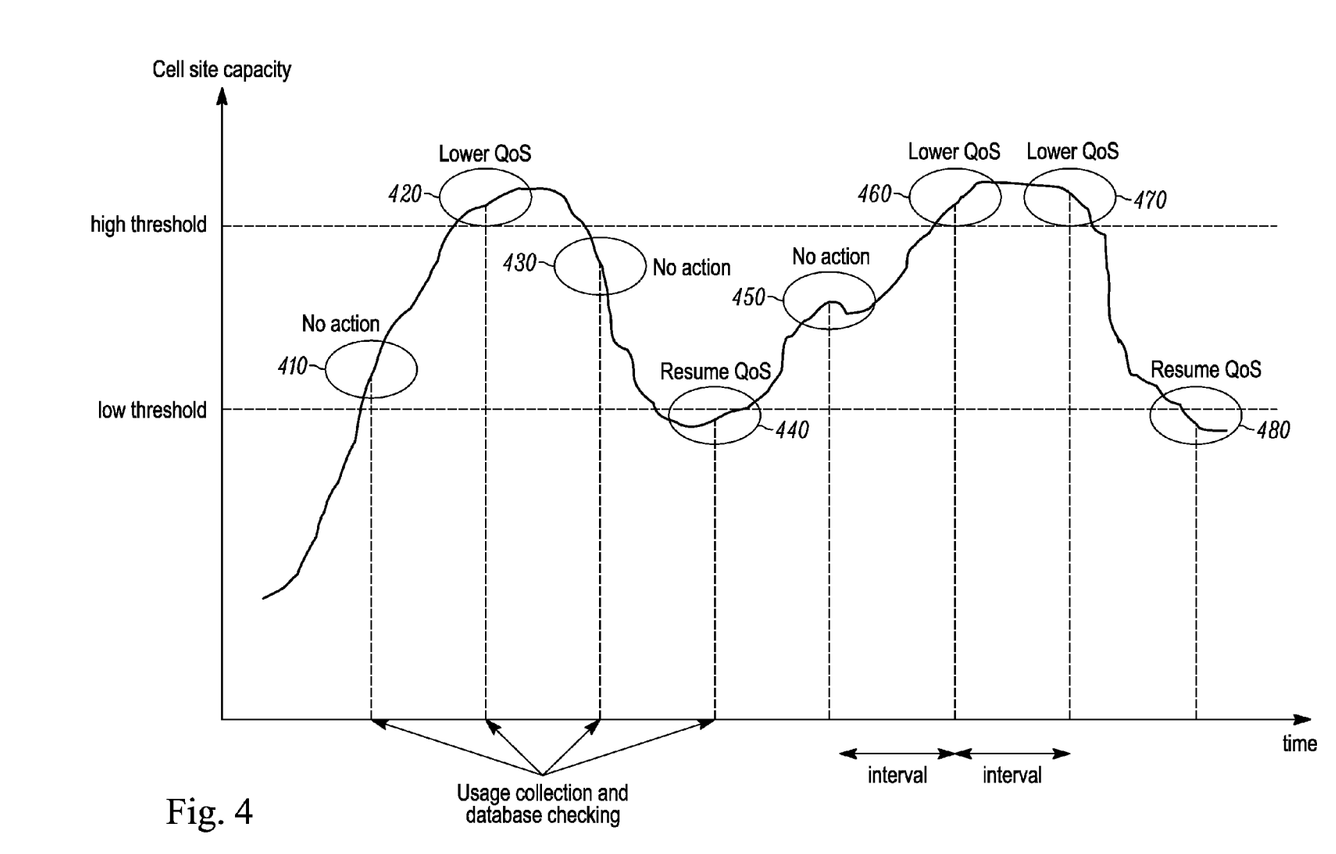
FIG. 4 presents a timeline of activations changes in QoS according to an embodiment of the invention.

FIG. 4 presents an example timeline of activations changes in QoS according to an embodiment of the invention. In phase 410 the system has ongoing monitoring of particular cell site usage, and the total usage by the terminals is under the high threshold value. In this phase the system according to the embodiment makes no action regarding to change QoS. In phase 420 the cell site usage has increased above the high threshold value. When the usage has increased over the high threshold the system identifies high usage subscribers 104A using this cell site 110A, and triggers a Lower QoS command to the quota server for those users 104A. Further in phase 430 the cell site usage has decreased. Such a decrease may occur though the lowering of QoS of the high usage subscribers or the cell site serving fewer mobiles. The total cell site usage has not decreased enough to allow resume service command for those high usage users.

Now in phase 440 the total cell site usage has decreased to a point where a resume QoS command is triggered for the high usage users 104A. The system is triggered to return their QoS to the original settings. In phase 450 the cell site usage again increases, but below the high threshold value, thus no action is taken by the system according to the embodiment. In phase 460 the cell site usage has again increased above the high threshold value. When the usage has increased over the high threshold, the system identifies high usage subscribers 104A using this cell site 110A and triggers a Lower QoS command to the quota server for those users. Despite the Lower QoS command in phase 470, the cell site usage is still above the high threshold. One possible reason for this is that new high usage subscribers have transferred into this cell site during the previous interval. Then, only new high usage subscribers will have their QoS lowered. And again in phase 480 the total cell site usage has decreased to a point where a resume QoS command is triggered for the high usage users, returning their QoS to the original settings.

This only exemplifies the functioning of the system in order to effectively resume or lower heavy users' bandwidth and QoS.

Figure 2:
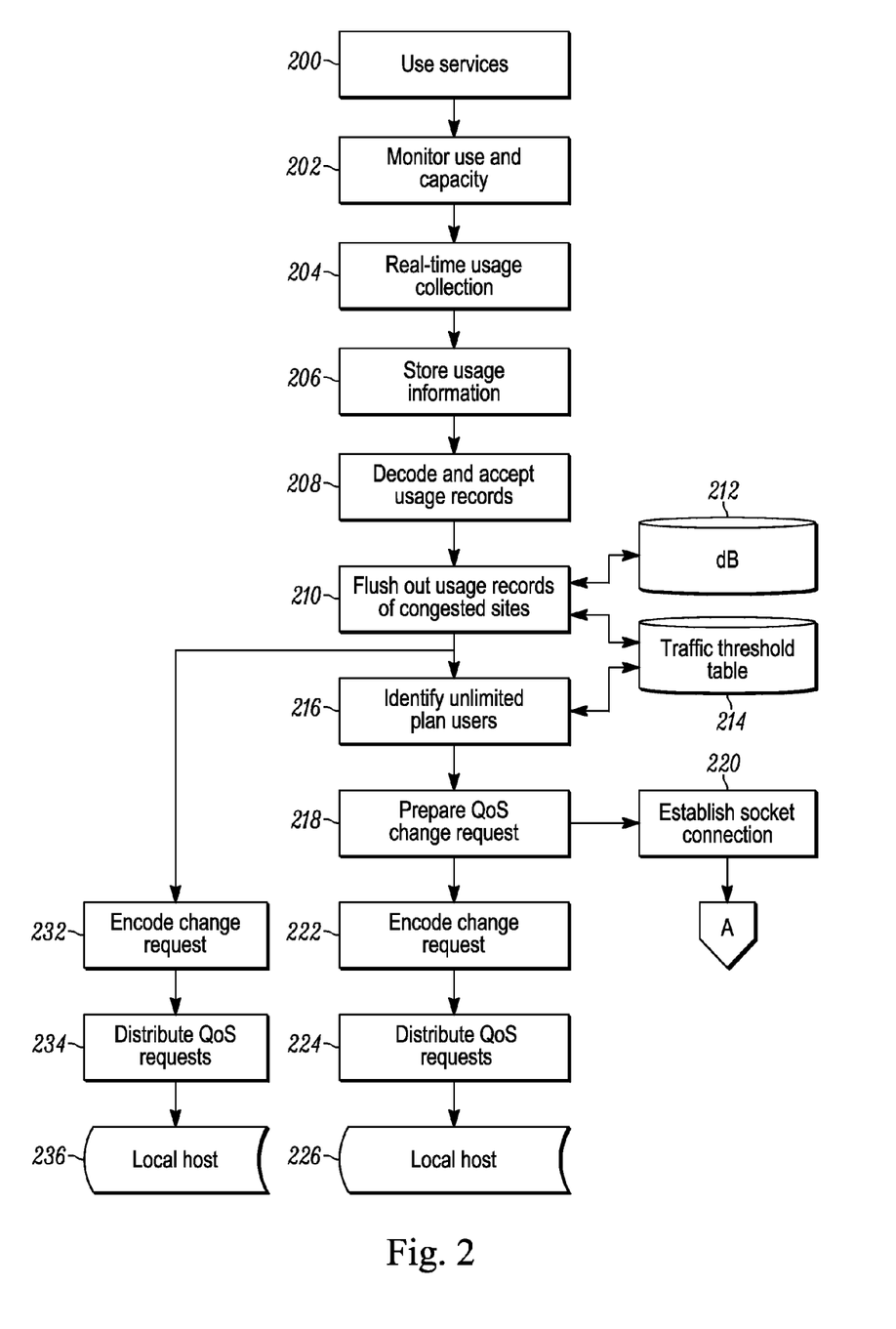
FIG. 2 presents a flow diagram of real-time traffic monitoring according to an embodiment of the invention.

FIG. 2 presents an example how the information of cell-sites capacity and the usage data of all users connected to the cell-site are collected in real-time and further how the collected information is processed efficiently and in a controlled and reliable manner according to a preferred embodiment of the invention.

There are some parameters and indication levels that should be determined and taken into account in the usage information processing when analyzing cell site capacity together with heavy users. The selection of these is, of course, dependent on the embodiment and practical application environment. However, as an example only, these parameters and indication levels may include identity of a cell site, identity of a user, interval of examining cell site data usage, validity of usage record under processing, time period for resume QoS request, time period for lower QoS request, high and low thresholds for total volumes of uplink and downlink data usage in a cell site, etc.

In phase 200 in communications network the users utilize different services e.g. voice calls, data calls, facsimiles, e-mail, web browsing, messaging, downloading, internet etc. with their terminal equipment e.g. mobile phones, PDAs, computers, etc. Some of the users have unlimited plan to use bandwidth as much as the service used requires. This means that these users have changing bandwidth and QoS levels within their active and current sessions. The changes depend on capacity level in a particular cell site. All services requested by the users are based on sessions which go at first through the communications network's elements such as SGSN. In phase 202 the usage information of services requested and used by users and the needed communication capacity of cell site are monitored and collected at such points of network where all the traffic goes through. In a preferred embodiment of the invention in phase 204 the usage information (e.g. S-CDR) is collected in real-time by a collector node via real-time socket, using for example GTP' protocol. The usage information can also be collected file-based but it should be noted that then the usage collection must be timed often enough because otherwise the cell site may be congested. In a preferred embodiment of the invention in this phase all the information regarding the sessions are collected such as charging as well. In phase 206 the collector node stores the collected usage information via TCP socket stream into an internal database. In phase 208 the usage records are decoded into an internal format of the processing system, such as the mediation system 170. In this phase the usage records containing relevant information on cell site capacity are only accepted for further processing.

In phase 210 only the usage records accepted in phase 208 are combined in aggregator node. The usage records are identified to belong to the same usage or session by cell site (110A) and user (104A). If it is the same usage, the usage record is aggregated with other partial stored in database in phase 212. In a preferred embodiment of the invention the database is implemented by in-memory facilities to be feasible to meet the requirements of being in time and ready to process huge amount of usage records. Also at this phase the update of the usage of cell site is processed against a static table for indicating what cell sites are congested. If usage records stay in in-memory database over a predetermined time interval, the mediation system 170 examines the total data usage volume of all sessions on each cell site that is congested. The usages are compared against the traffic threshold table 214. Consequently, those usage records belonging to congested cell sites are flushed out to next node for further processing. The other usage records are cleaned out in in-memory database for next processing event.

In phase 216 the processing system 170 examines which users have an unlimited plan. This can be done against the lookup table disclosed above. For those unlimited plan users, usage record is proceeding to next node for QoS change. The unlimited user list is uploaded onto the processing lookup server and it is updated in a certain time period. This phase also identifies the unlimited plan users on the congested cell site. A specific node parameter will be used to compare against current total volume of each unlimited plan user.

In phase 218 the QoS request sender node prepares the QoS change request according to the usage record. Further in phase 220 the request sender node establishes and maintains a socket connection through an application program interface to an activation system 180. At point "A" the QoS change request (Resume or Lower) has been transmitted to the activation system 180 for execution.

In phase 222 the QoS change requests are encoded for tracking back what are the requests that have been sent to the activation system 180. In phase 224 the QoS requests are distributed to local host 226 for further examination or for statistical purposes.

In phase 232 the usage records are encoded for tracking back what are the users that have reached to high volume usage threshold in aggregator node. In phase 234 the usage records are distributed to local host 236 for further examination or for statistical purposes.

Figure 3:
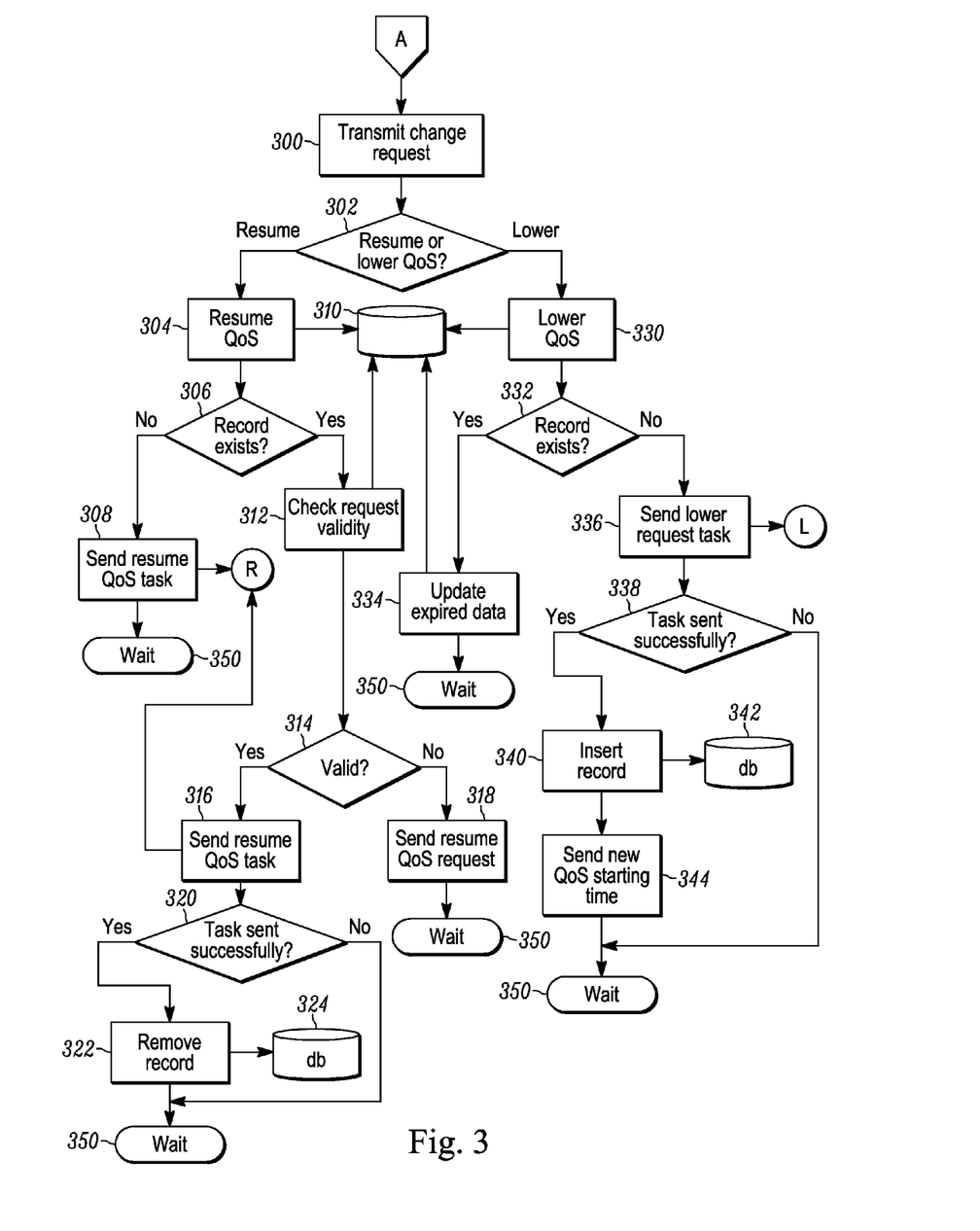
FIG. 3 presents a flow diagram of using a negative feedback mechanism according to an embodiment of the invention.

FIG. 3 presents an example how a user's terminal is controlled and obliged to use lower bandwidth or how a user's terminal is restored and resumed by the system according to a preferred embodiment of the invention.

Continuing now at the point "A" and phase 300 in FIG. 3 the QoS change request (Resume or Lower) has been transmitted to the activation system 180 for execution. In phase 302 the activation system determines whether the QoS request is Resuming or Lowering request. In case of Resuming 304 the activation system checks does the resuming record already exist in the database 310.

In response 306 to the check that there is not resuming record in database 308 the activation system sends a resuming "R" QoS task to QoS server 140. After that the activation system waits for next QoS change request 350.

In response 306 to the check that there is a resuming record in database the activation system checks 312 the request's validity from database 310. The validity is checked 314 for instance by comparing the start time of the request to an expiration time. In case of the validity (start time is greater or equal to expiration time) the activation system sends a resuming "R" QoS task 316 to QoS server 140. The activation system checks 320 if the resuming QoS task is successfully sent 322. If the check is clear, the record will be removed from the database 324. If the resuming QoS task is not successfully sent, the record will be left in the database. After that the activation system waits for next QoS change request 350.

In phase 314 if the request has expired, the activation system sends 318 a resuming QoS request to the start of activation phase 300 with a new starting time. After that the activation system waits for next QoS change request 350.

Continuing again at the point "A" and phase 300 in FIG. 3 the QoS change request (Resume or Lower) has been transmitted to the activation system 180 for execution. In phase 302 the activation system determines whether the QoS request is Resuming or Lowering request. In case of Lower 330 the activation system checks does the lowering record already exist in the database 310.

In response to the check 332 that there is a lowering record in database, the activation system updates 334 the expired data on the record in database 310. The update can be for instance a new expiration time which is a sum of the timestamp and resume interval. After that the activation system waits for next QoS change request 350.

In response to the check 332 that there is not a lowering record in database, the activation system sends 336 a change "L" or lower "L" QoS task to QoS server 140. The activation checks 338 if the changing or lowering QoS task is successfully sent 340. If the check is clear, the record will be inserted with an expired time in database 342.

The new expiration time can be for instance the current time plus the resuming interval. In phase 344 the activation system sends out a QoS request with a new starting request time with the newly summed expiration time. If the changing or lowering QoS task is not successfully sent, the record will be sent back to starting point. After that the activation system waits for next QoS change request 350.

The usage record collecting and processing can be done with the same applicant's mediation system and processing elements thereto which are described in the applications U.S. Ser. No. 10/518,553; U.S. Ser. No. 11/571,700; U.S. Ser. No. 11/916,786 and U.S. Ser. No. 12/177,620, and which are incorporated herein by reference.

The QoS change request processing can be done with the same applicant's activation system which is described in the application U.S. Ser. No. 10/515,956, and which is incorporated herein by reference.

As is apparent from the above disclosure, an embodiment provides a method of controlling data traffic between a plurality of mobile terminals 102A, 102B, 104A, 104B and a mobile network comprising a plurality of cell sites 110A, 110B, 110C. The method according to one embodiment comprises:

monitoring cell-site-specific volumes of data traffic 100 in order to detect high-load cell sites (e.g. 110A and 110B) among the plurality of cell sites, for each of the detected high-load cell sites, performing a mobile-terminal-specific analysis of data traffic 100 in order to select at least one of the mobile terminals 102A, 102B, 104A, 104B for traffic limitation, and temporarily limiting the data traffic 100 between the mobile network and the selected at least one mobile terminal (e.g. 104A and 104B).

In an embodiment, the monitoring of the cell-site-specific volumes of data traffic 100 can include receiving and analyzing event records from network elements of the mobile network.

In an embodiment, the monitoring of the cell-site-specific volumes of data traffic 100 can include receiving event records from network elements of the mobile network in real time via a real-time protocol.

In a further embodiment, the monitoring of the cell-site-specific volumes of data traffic comprises aggregating the received event records by cell site to produce a cell-site-specific usage record for each of the cell sites, and periodically examining the cell-site-specific usage records. These steps can be performed by means of the mediation system 170, for instance.

There is also an embodiment comprising the steps of aggregating the received event records by mobile terminal to produce a mobile-terminal-specific usage record for each of the mobile terminals, and using the produced mobile-terminal-specific usage records in the mobile-terminal-specific analysis of data traffic. These steps can be performed by means of the mediation system 170, for instance.

The aggregated usage records in the above embodiments may each cover a certain period of time and the method can comprise repeatedly aggregating such usage records such that the usage records cover consecutive periods of time.

In one embodiment, the detection of the high-load cell sites among the plurality of cell sites comprises comparing the cell-site-specific volumes of data traffic against cell-site-specific thresholds defined for the respective cell sites, and selecting as the high-load cell sites each of the cell sites for which the cell-site-specific volume of data traffic exceeds the cell-site-specific threshold.

Such cell-site-specific thresholds can be separately set for the downlink and the uplink of the cell site or one threshold for the total traffic may be used, if desired.

In one embodiment, the mobile-terminal-specific analysis of data traffic includes deriving mobile-terminal-specific volumes of data traffic in order to identify a group of high-use mobile terminals, and selecting mobile terminals for traffic limitation among the group of high-use mobile terminals. Such a step of selecting mobile terminals for traffic limitation may include applying selection criteria for making the selection. In one embodiment, the selection criteria include at least one of: volume of data traffic, type of service used over the data traffic and type of subscription used by the mobile terminal.

In an embodiment, each of the mobile terminals has an associated Quality of Service, QoS, and the step of temporarily limiting the data traffic between the mobile network and the mobile terminal includes first lowering the QoS and then resuming the QoS.

Such a resumption of the QoS can be triggered by a timer, for instance. Another possibility is to trigger the resumption on the basis of the current traffic load lowering under a low threshold. Also a suitable combination of criteria can be used.

One embodiment comprises periodically comparing the cell-site-specific volume of data traffic of each of the high-load cell sites against a cell-site-specific low threshold, and triggering the step of resuming the QoS in case of finding that the volume of data traffic is less than the cell-site-specific low threshold.

The periods of time referred to above can be selected, for instance, to have values less than 30 minutes, such as between 1 and 20 minutes, for example between 5 and 15 minutes.

In one embodiment, there is provided a mediation and activation system 170, 180 that is adapted to perform a method according to any one the above described embodiments.

Furthermore, there are provided computer program products comprising program code capable of instructing a computer system to perform methods according to the above described embodiments.

The above description is only to exemplify the invention and is not intended to limit the scope of protection offered by the claims. The claims are also intended to cover the equivalents thereof and not to be construed literally.

What is claimed:

1. A method of controlling data traffic between a plurality of mobile terminals and a mobile network comprising a plurality of cell sites, the method comprising:
    monitoring cell-site-specific volumes of data traffic in order to detect high-load cell sites among the plurality of cell sites; wherein the monitoring cell-site-specific volumes of data traffic comprises receiving and analyzing event records from network elements of the mobile network, aggregating the received event records per cell site to produce a cell-site-specific usage record for each of the cell sites, and periodically examining the cell-site-specific usage record
    for each of the detected high-load cell sites, performing a mobile-terminal-specific analysis of data traffic in order to select at least one of the mobile terminals for traffic limitation, and
    temporarily limiting the data traffic between the mobile network and the selected at least one mobile terminal.

2. The method of claim 1, wherein the monitoring cell-site-specific volumes of data traffic comprises receiving event records from network elements of the mobile network in real time via a real-time protocol.

3. The method according to claim 1, comprising:
    aggregating the received event records per mobile terminal to produce a mobile-terminal-specific usage record for each of the mobile terminals, and
    using the produced mobile-terminal-specific usage records in the mobile-terminal-specific analysis of data traffic.

4. The method according to claim 1, wherein the aggregated usage records each cover a period of time and the method comprises repeatedly aggregating such usage records covering consecutive periods of time.

5. The method according to claim 1, comprising detecting the high-load cell sites among the plurality of cell sites by:
    comparing the cell-site-specific volumes of data traffic against cell-site-specific thresholds defined for the respective cell sites, and
    selecting as the high-load cell sites each of the cell sites for which the cell-site-specific volume of data traffic exceeds the cell-site-specific threshold.

6. The method according to claim 1, wherein the mobile-terminal-specific analysis of data traffic includes:
    deriving mobile-terminal-specific volumes of data traffic in order to identify a group of high-use mobile terminals, and
    selecting mobile terminals for traffic limitation among the group of high-use mobile terminals.

7. The method of claim 6, wherein selecting mobile terminals for traffic limitation includes applying selection criteria for making the selection, wherein the selection criteria includes at least one of: volume of data traffic, type of service used over the data traffic and type of subscription used by the mobile terminal.

8. The method according to claim 1, wherein each of the mobile terminals has an associated Quality of Service, QoS, and temporarily limiting the data traffic between the mobile network and the selected at least one mobile terminal includes:
    lowering the QoS of the selected at least one mobile terminal, and
    resuming the QoS.

9. The method of claim 8, wherein resuming the QoS is triggered by a timer.

10. The method of claim 8, comprising, for each of the high-load cell sites:
    periodically comparing the cell-site-specific volume of data traffic against a cell-site-specific low threshold, and
    triggering resuming the QoS in case of finding that the volume of data traffic is less than the cell-site-specific low threshold.

11. The method according to claim 8, wherein the volumes of data traffic are determined periodically over consecutive periods of time, the period of time being less than 30 minutes.

12. A mediation and activation system for a mobile network comprising a plurality of cell sites, the system comprising:
    a mediation system configured to monitor cell-site-specific volumes of data traffic in order to detect high-load cell sites among the plurality of cell sites by (i) receiving and analyzing event records from network elements of the mobile network, (ii) aggregating the received event records per cell site to produce a cell-site-specific usage record for each of the cell sites, and (iii) periodically examining the cell-site-specific usage records,
    the mediation system further configured to, for each of the detected high-load cell sites, perform a mobile-terminal-specific analysis of data traffic in order to select at least one of the mobile terminals for traffic limitation; and
    an activation system configured to temporarily limit the data traffic between the mobile network and the selected at least one mobile terminal.

13. A non-volatile computer program product having stored therein program code capable of instructing a computer system to perform a method, the method comprising:
    monitoring cell-site-specific volumes of data traffic in order to detect high-load cell sites among the plurality of cell sites, wherein the monitoring cell-site-specific volumes of data traffic comprises receiving and analyzing event records from network elements of the mobile network, aggregating the received event records per cell site to produce a cell-site-specific usage record for each of the cell sites, and periodically examining the cell-site-specific usage records;
    for each of the detected high-load cell sites, performing a mobile-terminal-specific analysis of data traffic in order to select at least one of the mobile terminals for traffic limitation; and
    temporarily limiting the data traffic between the mobile network and the selected at least one mobile terminal.

14. The method according to claim 3, wherein the aggregated usage records each cover a period of time and the method comprises repeatedly aggregating such usage records covering consecutive periods of time.

15. The method according to claim 8, comprising detecting the high-load cell sites among the plurality of cell sites by:
    comparing the cell-site-specific volumes of data traffic against cell-site-specific thresholds defined for the respective cell sites, and
    selecting as the high-load cell sites each of the cell sites for which the cell-site-specific volume of data traffic exceeds the cell-site-specific threshold.

16. The method according to claim 8, wherein the mobile-terminal-specific analysis of data traffic includes:
    deriving mobile-terminal-specific volumes of data traffic in order to identify a group of high-use mobile terminals, and
    selecting mobile terminals for traffic limitation among the group of high-use mobile terminals.

17. The method according to claim 15, wherein the mobile-terminal-specific analysis of data traffic includes:

deriving mobile-terminal-specific volumes of data traffic in order to identify a group of high-use mobile terminals, and selecting mobile terminals for traffic limitation among the group of high-use mobile terminals.

18. The method according to claim 11, wherein the period of time is less than about 20 minutes.

19. The method according to claim 11, wherein the period of time is between about 5 and 15 minutes.

* * * * *